(12) United States Patent
Jeon

(10) Patent No.: US 10,427,590 B2
(45) Date of Patent: Oct. 1, 2019

(54) APPARATUS AND METHOD FOR CONTROLLING HIGH LAMP OF VEHICLE

(75) Inventor: Yeongsun Jeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 492 days.

(21) Appl. No.: 14/131,172

(22) PCT Filed: Jul. 9, 2012

(86) PCT No.: PCT/KR2012/005425
§ 371 (c)(1),
(2), (4) Date: Jan. 6, 2014

(87) PCT Pub. No.: WO2013/009058
PCT Pub. Date: Jan. 17, 2013

(65) Prior Publication Data
US 2014/0146175 A1     May 29, 2014

(30) Foreign Application Priority Data

Jul. 13, 2011 (KR) ........................ 10-2011-0069334

(51) Int. Cl.
*B60Q 1/14* (2006.01)
*B60Q 1/08* (2006.01)

(52) U.S. Cl.
CPC .......... *B60Q 1/1423* (2013.01); *B60Q 1/085* (2013.01); *B60Q 2300/314* (2013.01); *B60Q 2300/40* (2013.01)

(58) Field of Classification Search
CPC .... H04N 5/2351; H04N 5/235; G09G 3/3406; B60Q 2300/42; B60Q 1/085; B60Q 2300/122; B60Q 2300/054; B60Q 2300/056; G06K 9/00825
See application file for complete search history.

(56) References Cited

U.S. PATENT DOCUMENTS

| | | | |
|---|---|---|---|
| 2007/0147055 A1* | 6/2007 | Komatsu | B60Q 1/085 362/464 |
| 2009/0254247 A1* | 10/2009 | Osanai | B60Q 1/143 701/36 |
| 2009/0323366 A1 | 12/2009 | Furusawa | |
| 2010/0091513 A1* | 4/2010 | Kamioka | B60Q 1/1423 362/523 |

FOREIGN PATENT DOCUMENTS

| | | |
|---|---|---|
| JP | 6-270733 A | 9/1994 |
| JP | 2004-347555 A | 12/2004 |
| JP | 2005-41293 A | 2/2005 |

OTHER PUBLICATIONS

Ronald B. Gibbons, "Glare Modeling Formulae", pp. 20-21.*

* cited by examiner

*Primary Examiner* — Farhan Mahmud
(74) *Attorney, Agent, or Firm* — Birch, Stewart, Kolasch & Birch, LLP

(57) ABSTRACT

According to an exemplary embodiment of the present invention, the apparatus for controlling high lamp in a vehicle includes a camera photographing a subject in front of the vehicle, a brightness measurer measuring brightness from an image of the subject in front of the vehicle photographed by the camera, and a controller controlling the high lamp using a brightness data measured by the brightness measurer.

17 Claims, 4 Drawing Sheets

[Fig. 1]
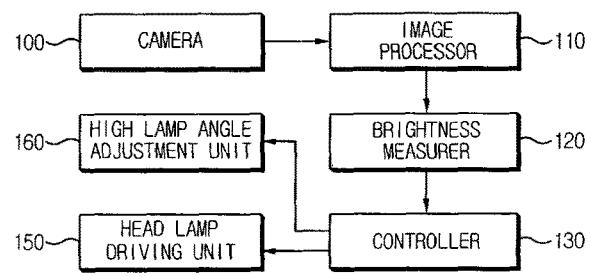
[Fig. 2]
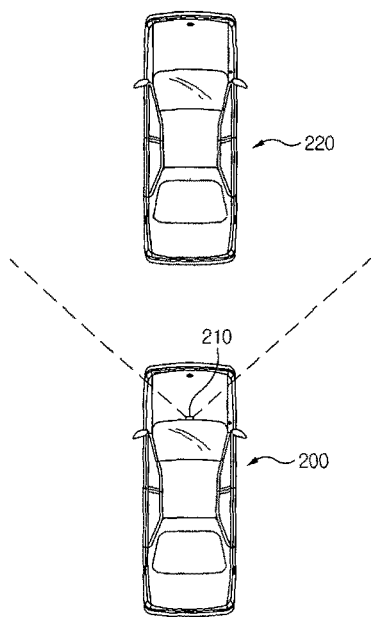
[Fig. 3]
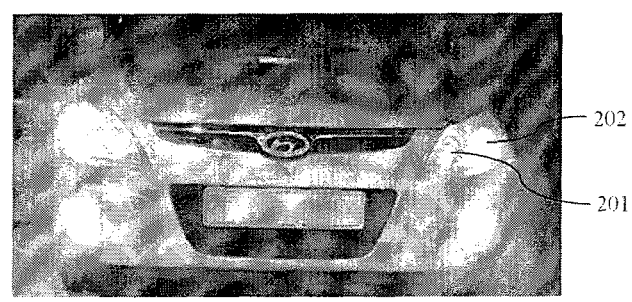

[Fig. 4]
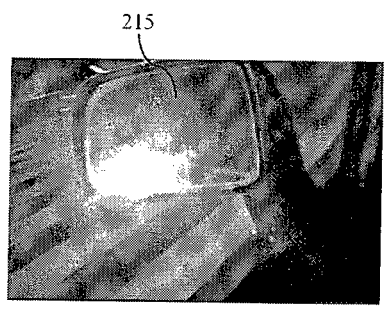
[Fig. 5]
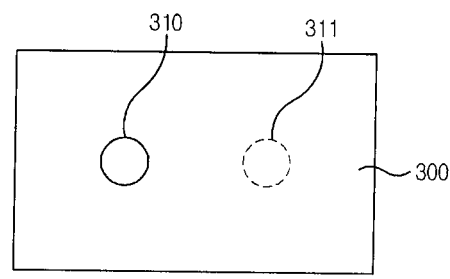

[FIG. 6]
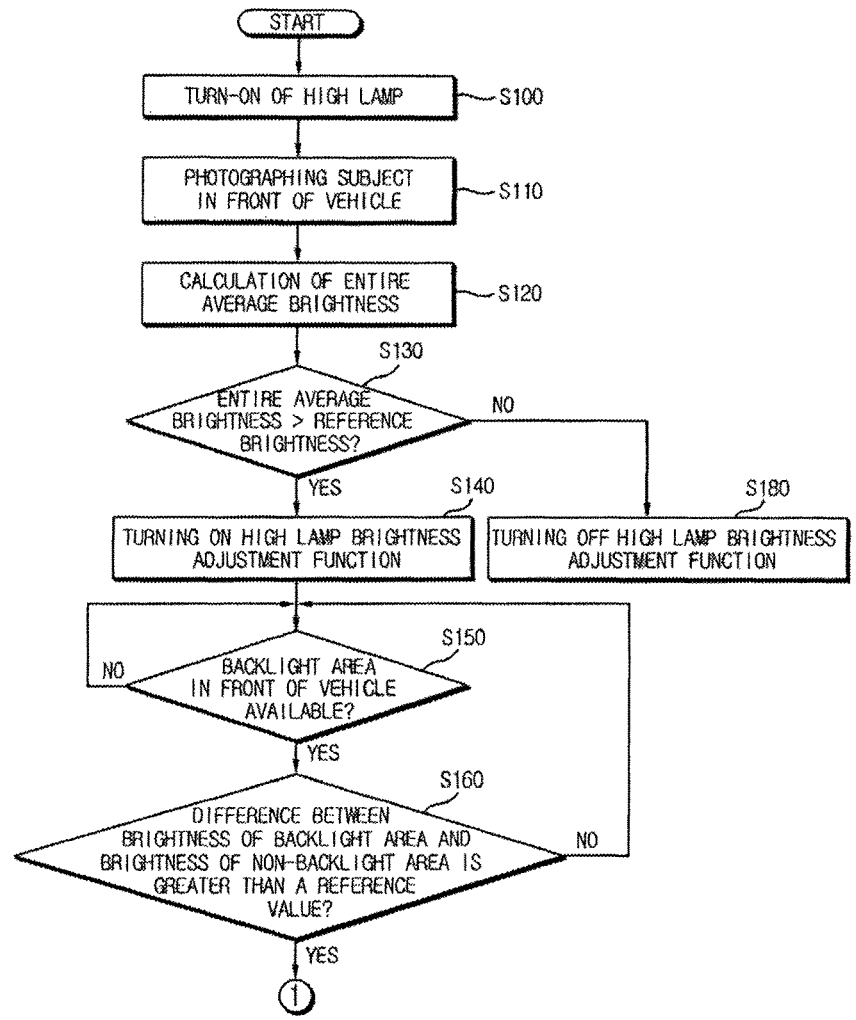
[Fig. 7a]
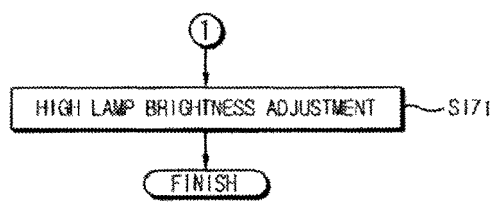
[Fig. 7b]
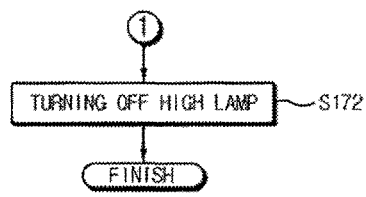

[Fig. 7c]
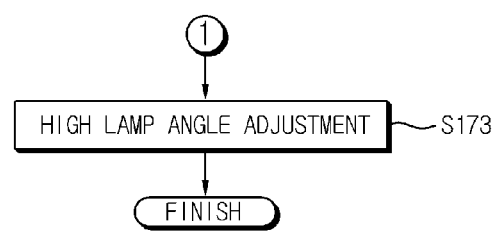

APPARATUS AND METHOD FOR CONTROLLING HIGH LAMP OF VEHICLE

TECHNICAL FIELD

The teachings in accordance with exemplary embodiments of this invention relate generally to an apparatus and method for controlling high lamp of vehicle.

BACKGROUND ART

Generally, a high lamp (uplighter or high beam) of a headlamp has a visibility twice that of a general head light.

To be more specific, a headlamp for use in a vehicle is structured such that a high beam light distribution serving as a light distribution suitable for use in a normal running of the vehicle, a dark country road where street light is insufficient or a road where lighting facilities are insufficient, and a low beam light distribution serving as a light distribution for preventing a dazzle with respect to a vehicle running ahead or an oncoming vehicle can be switched over to each other.

The high beam light distribution enables a driver to easily recognize an obstacle or a pedestrian at a poor visibility area. However, although a high beam should be preferably used for its original purpose, some drivers use a high beam light distribution on a road according to driver habit, where use of high beam is not necessary. In a case the high beam is used where it is not necessary, there may occur an accident because of high beam glare of headlights of oncoming vehicles.

DISCLOSURE OF INVENTION

Technical Problem

Accordingly, embodiments of the present invention may relate to an apparatus and method for controlling high lamp of a vehicle that substantially obviates one or more of the above disadvantages/problems due to limitations and disadvantages of related art.

Technical problems to be solved by the present invention are not restricted to the above-mentioned, and any other technical problems not mentioned so far will be clearly appreciated from the following description by skilled in the art.

Solution to Problem

An apparatus for controlling high lamp of a vehicle according to one exemplary embodiment of the present invention is comprising: a camera photographing a subject in front of the vehicle; a brightness measurer measuring brightness from an image of the subject in front of the vehicle photographed by the camera; a controller controlling the high lamp using a brightness data measured by the brightness measurer.

Preferably, but not necessarily, the controller is configured to adjust the brightness of the high lamp, or apply a control signal to a high lamp driving unit driving the high-lamp in order to cut off an electric power.

Preferably, but not necessarily, the controller is configured to apply a control signal to a high lamp angle adjuster in order to adjust an angle of the high lamp.

Preferably, but not necessarily, the high lamp angle adjuster is configured to adjust a horizontal direction angle.

Preferably, but not necessarily, the high lamp angle adjuster is configured to adjust a vertical direction angle.

Preferably, but not necessarily, the camera is mounted at a front side of the vehicle in order to photograph a subject in front of the vehicle.

Preferably, but not necessarily, the camera is mounted near to the high lamp of the vehicle.

Preferably, but not necessarily, the camera is mounted at a front side of the vehicle.

Preferably, but not necessarily, the camera performs a camera function for black box.

Preferably, but not necessarily, the brightness data measured by the brightness measurer is an entire average brightness of the image of the subject, and the controller is configured to compare a reference brightness with the entire average brightness of the image of the subject.

Preferably, but not necessarily, the controller is configured to adjust the brightness of the high lamp, in a case the entire average brightness of the image of the subject is greater than the reference brightness.

A method for controlling high lamp of a vehicle according to another exemplary embodiment of the present invention is comprising: turning on a high lamp of a vehicle; photographing, by a camera, a subject in front of a vehicle; calculating an entire average brightness of an image of the subject in front of the vehicle photographed by the camera; determining whether the entire average brightness of an image of the subject is greater than a reference brightness; and turning off a brightness adjusting function of the high lamp, in a case the entire average brightness of an image of the subject is greater than the reference brightness.

A method for controlling high lamp of a vehicle according to still another exemplary embodiment of the present invention is comprising: turning on a high lamp of a vehicle; photographing, by a camera, a subject in front of a vehicle; calculating an entire average brightness of an image of the subject in front of the vehicle photographed by the camera; determining whether the entire average brightness of an image of the subject is greater than a reference brightness; turning on a brightness adjusting function of the high lamp, in a case the entire average brightness of an image of the subject is greater than the reference brightness; determining whether a backlight area of a front vehicle is available at the image of the subject; determining whether a difference between brightness of the backlight area of the front vehicle and brightness of non-backlight area of the front vehicle is greater than a reference value, in a case the backlight area of a front vehicle is available at the image of the subject; and controlling the high lamp, in a case the difference between brightness of the backlight area of the front vehicle and brightness of non-backlight area of the front vehicle is greater than a reference value.

Preferably, but not necessarily, the control of the high lamp is one of performance of high lamp brightness adjustment, turn-off of high lamp and high lamp angle adjustment.

Preferably, but not necessarily, the high lamp angle adjustment is to adjust an angle of horizontal direction.

Preferably, but not necessarily, the high lamp angle adjustment is to adjust an angle of vertical direction.

Preferably, but not necessarily, the camera is mounted near to the high lamp of the vehicle.

Advantageous Effects of Invention

The apparatus and method for controlling high lamp of a vehicle according to an exemplary embodiment of the present invention have advantageous effects in that dangerous accidents caused by high beam glare of headlights of oncoming vehicles can be prevented by photographing a subject in front of a vehicle, adjusting brightness of high lamp in response to the brightness measured from an image of the photographed subject, cutting off supply of electric power, or automatically adjusting an angle of the high lamp, and a driver can concentrate to drive by reducing inconveniences of repeatedly turning on or off the high lamp for each time and circumstance.

BRIEF DESCRIPTION OF DRAWINGS

FIG. 1 is a schematic block diagram illustrating an apparatus for controlling high lamp of a vehicle according to an exemplary embodiment of the present invention.

FIG. 2 is a schematic view illustrating a camera photographing a subject in front of a vehicle according to an exemplary embodiment of the present invention.

FIG. 3 is a photographic view of a vehicle that is turned on with a high lamp.

FIG. 4 is a photographic view illustrating a rear view minor of a vehicle.

FIG. 5 is schematic view illustrating a method of adjusting brightness of high lamp in an image photographed by a camera mounted on a vehicle according to an exemplary embodiment of the present invention.

FIG. 6 is a schematic flowchart illustrating a method for controlling high lamp of a vehicle according to an exemplary embodiment of the present invention.

FIGS. 7*a*, 7*b* and 7*c* are schematic flowcharts illustrating steps subsequent to FIG. 6.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thus," "then," "next," "therefore", etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the apparatus and method for controlling high lamp of a vehicle according to exemplary embodiments of the present invention will be described in detail with reference to the accompanying drawings.

FIG. 1 is a schematic block diagram illustrating an apparatus for controlling high lamp of a vehicle according to an exemplary embodiment of the present invention.

The apparatus for controlling high lamp of a vehicle according to one exemplary embodiment of the present invention includes a camera (100) photographing a subject in front of the vehicle; a brightness measurer (120) measuring brightness from an image of the subject in front of the vehicle photographed by the camera (100); a controller (130) controlling the high lamp using a brightness data measured by the brightness measurer (120), where an image processor (110) processes the image of the subject in front of the vehicle photographed by the camera (100) and transmits the processed image to the brightness measurer (120).

The camera (100) is preferably mounted at a front side of a vehicle in order to photograph a subject in front of the vehicle. The controller (130) may be configured to adjust brightness of the high lamp, or supply a control signal to a head lamp driving unit driving the high lamp for cutting off an electric power.

That is, the camera (100) photographs a subject in front of a vehicle, the brightness measurer (120) measures brightness of an image of the subject in front of the vehicle photographed by the camera (100), and the controller (130) controls a head lamp driving unit (150) using brightness data measured by the brightness measurer (120) to cut off supply of electric power to the high lamp in response the measured brightness data or adjust the brightness of the high lamp.

Furthermore, the controller (130) may be configured to supply a control signal to a high lamp angle adjuster (160) in order to adjust an angle of the high lamp, where the high lamp angle adjuster (160) may be configured to adjust an angle of the high lamp to a horizontal direction, a vertical direction or a combined direction where the horizontal direction and the vertical direction are combined. Thus, the controller (130) can receive the brightness data measured by the brightness measurer (120) to output a control signal to the high lamp angle adjuster (160), whereby the angle of the high lamp can be adjusted.

Still furthermore, the camera (100) may be mounted near to the high lamp of the vehicle, or mounted at a front side of the vehicle. The camera (100) may perform a camera function for black box. The brightness data measured by the brightness measurer (120) is an entire average brightness of the image of the subject, and the controller (130) is configured to compare reference brightness with the entire average brightness of the image of the subject and to control the high lamp. The controller (130) may be also configured to adjust the brightness of the high lamp, in a case the entire average brightness of the image of the subject is greater than the reference brightness.

Therefore, the apparatus for controlling high lamp of a vehicle according to an exemplary embodiment of the present invention has advantages in that dangerous accidents caused by high beam glare of headlights of oncoming vehicles can be prevented by photographing a subject in front of a vehicle, adjusting brightness of high lamp in response to the brightness measured from an image of the photographed subject, cutting off supply of electric power, or automatically adjusting an angle of the high lamp, and a driver can concentrate to drive by reducing inconveniences of repeatedly turning on or off the high lamp for each time and circumstance.

FIG. 2 is a schematic view illustrating a camera photographing a subject in front of a vehicle according to an exemplary embodiment of the present invention, FIG. 3 is a photographic view of a vehicle that is turned on with a high lamp, FIG. 4 is a photographic view illustrating a rear view minor of a vehicle, and FIG. 5 is schematic view illustrating a method of adjusting brightness of high lamp in an image photographed by a camera mounted on a vehicle according to an exemplary embodiment of the present invention.

Referring to FIG. 2, a camera (210) mounted at a front side of a vehicle (200) to photograph a subject in front of the vehicle (200). At this time, a vehicle (220) in front of the vehicle (200) is photographed by the camera (210) while the vehicle (200) is travelling in the night. The camera (210) photographs a rear side of the vehicle (220), and a backlight at the rear side of the vehicle (220) is included in a photographed image.

As mentioned above, the apparatus for controlling high lamp of a vehicle according to an exemplary embodiment of the present invention measures brightness from an image of a subject in front of a vehicle photographed by the camera (100) to control the high lamp, where the brightness of the image of the subject in front of the vehicle is brightness of a rear lamp of the front vehicle and a surrounding light source, and where amount of brightness is detected.

Thus, the brightness of the high lamp is reduced, or turned off, or an angle of the high lamp is adjusted by brightness measured from an image of a subject in front of the vehicle photographed by the camera (210).

At this time, as shown in FIG. 5, a brightness difference between a backlight area (310) of the front vehicle and non-light area (311) is detected by using an image (300) of a subject of a front vehicle photographed by the camera (210) to adjust the brightness of the high lamp.

For example, the brightness of the high lamp is adjusted, only if the brightness difference between the backlight area (310) of the front vehicle and the non-light area (311) is 80%.

Meanwhile, as illustrated in FIG. 3, there are many instances, where a high lamp (201) and a low lamp (202) on a head light of a general vehicle are all turned on while driving due to driver habit, which may cause dangerous accidents to happen by high beam glare of headlights of oncoming vehicles.

Furthermore, as illustrated in FIG. 4, light of a high lamp of a vehicle with same direction may be reflected from a rear view mirror to cause glare to a driver, thereby hindering a safe driving. Therefore, the exemplary embodiment of the present invention functions to perform a safe driving by reducing the glare caused by high lamp.

MODE FOR THE INVENTION

FIG. 6 is a schematic flowchart illustrating a method for controlling high lamp of a vehicle according to an exemplary embodiment of the present invention, and FIGS. 7a, 7b and 7c are schematic flowcharts illustrating steps subsequent to S160 of FIG. 6.

The method for controlling high lamp of a vehicle according to an exemplary embodiment of the present invention is first to turn on a high lamp of a vehicle (S100). Successively, a camera photographs a subject in front of a vehicle (S110). Next, an entire average brightness of an image of the subject in front of the vehicle photographed by the camera is calculated (S120). Then, a determination is made as to whether the entire average brightness of an image of the subject is greater than reference brightness (S130). Thereafter, a brightness adjusting function of the high lamp is turned off, in a case the entire average brightness of an image of the subject is greater than the reference brightness (S180).

Furthermore, the brightness adjusting function of the high lamp is turned on, in a case the entire average brightness of an image of the subject is greater than the reference brightness (S140). A determination is made as to whether a backlight area of a front vehicle is available at the image of the subject (S150). Then, a determination is made as to whether a difference between brightness of the backlight area of the front vehicle and brightness of non-backlight area of the front vehicle is greater than a reference value, in a case the backlight area of a front vehicle is available at the image of the subject (S160). Then, the high lamp is turned off or controlled, in a case the difference between brightness of the backlight area of the front vehicle and brightness of non-backlight area of the front vehicle is greater than a reference value.

That is, the control of the high lamp is performance of high lamp brightness adjustment (S171) as shown in FIG. 7a, turn-off of high lamp as illustrated in FIG. 7b (S172), or high lamp angle adjustment as shown in FIG. 7c (S173).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the apparatus and method for controlling high lamp of a vehicle according to an exemplary embodiment of the present invention have industrial applicability in that dangerous accidents caused by high beam glare of headlights of oncoming vehicles can be prevented by photographing a subject in front of a vehicle, adjusting brightness of high lamp in response to the brightness measured from an image of the photographed subject, cutting off supply of electric power, or automatically adjusting an angle of the high lamp, and a driver can concentrate to drive by reducing inconveniences of repeatedly turning on or off the high lamp for each time and circumstance.

The invention claimed is:

1. An apparatus for controlling a high lamp of a reference vehicle, comprising:
   a camera photographing a rear side of a target vehicle in front of the reference vehicle;
   a brightness measurer measuring an entire average brightness of an image of the rear side of the target vehicle photographed by the camera, measuring the brightness of a backlight area of the target vehicle in the image and measuring the brightness of a non-backlight area of the target vehicle in the image; and
   a controller configured to:
   turn on a brightness adjusting function of the high lamp and adjust a brightness of the high lamp in order to remove glare to the eyes of a driver of the target vehicle, when the entire average brightness at the rear side of the target vehicle is greater than a predetermined reference brightness of the image of the rear side of the target vehicle,
   determine whether the backlight area of the target vehicle exists in the image,
   determine whether a brightness difference between the backlight area and the non-backlight area of the target vehicle is greater than a reference value, when the backlight area exists in the image,
   turn off the brightness adjusting function and control the high lamp when the brightness difference between the backlight area and the non-backlight area of the target vehicle is greater than the reference value,
   control the high lamp of the reference vehicle in order to remove glare to the eyes of the driver of the target vehicle, caused by light of the high lamp of the reference vehicle, and
   control the high lamp of the reference vehicle in order to remove glare to the eyes of a driver of the reference vehicle, caused by light of the high lamp of the reference vehicle reflected from a rear view mirror of the target vehicle,
   wherein the controlling of the high lamp is one of adjusting the brightness of the high lamp, turning-off of the high lamp and adjusting an angle of the high lamp.

2. The apparatus of claim 1, wherein the adjusting of the high lamp angle includes adjusting a horizontal direction angle of the high lamp.

3. The apparatus of claim 1, wherein the adjusting of the high lamp angle includes adjusting a vertical directions angle.

4. The apparatus of claim 1, wherein the camera is mounted at a front side of the reference vehicle in order to photograph the rear side of the target vehicle in front of the reference vehicle.

5. The apparatus of claim 1, wherein the camera is mounted near to the high lamp of the reference vehicle.

6. The apparatus of claim 1, wherein the camera is mounted at a front side of the reference vehicle.

7. The apparatus of claim 1, wherein the camera performs a camera function for black box.

8. The apparatus of claim 1, wherein the brightness data includes the entire average brightness of the image at the rear side of the target vehicle, and
   wherein the controller is configured to control the high lamp by comparing the predetermined reference brightness with the entire average brightness of the image at the rear side of the target vehicle.

9. The apparatus of claim 8, wherein the controller is configured to adjust the brightness of the high lamp when the entire average brightness of the image at the rear side of the target vehicle is greater than the reference brightness.

10. The apparatus of claim 1, wherein the difference between the backlight area and the non-backlight area of the target vehicle is less than a predetermined value.

11. A method for controlling a high lamp of a reference vehicle, the method comprising:
    turning on a high lamp of the reference vehicle; then
    photographing, by a camera mounted on the reference vehicle, a rear side of a target vehicle in front of the reference vehicle; then
    calculating, by a controller, an entire average brightness of an image of the target vehicle photographed by the camera; then
    determining, by the controller, whether the entire average brightness is greater than a predetermined reference brightness;
    when the entire average brightness is not greater than the predetermined reference brightness, turning off, by the controller, a brightness adjusting function of the high lamp;
    when the entire average brightness is greater than the predetermined reference brightness, turning on the brightness adjusting function of the high lamp by the controller, and determining, by the controller, whether a backlight area of the target vehicle exists in the image;
    detecting, by the controller, a brightness difference between the backlight area and a non-backlight area of the target vehicle; and
    when the brightness difference between the backlight area and a non-backlight area of the target vehicle is greater than a reference value, controlling, by the controller, the high lamp of the reference vehicle in order to remove glare to the eyes of a driver of the reference vehicle, caused by light of the high lamp of the reference vehicle reflected from a rear view mirror of the target vehicle, wherein the controlling of the high lamp is one of adjusting a brightness of the high lamp, turning-off of the high lamp and adjusting an angle of the high lamp.

12. The method of claim 11, wherein the adjusting the angle of the high lamp includes adjusting an angle of a horizontal direction.

13. The method of claim 11, wherein the adjusting the angle of the high lamp includes adjusting an angle of a vertical direction.

14. A method for controlling a high lamp of a reference vehicle, the method comprising:
turning on a high lamp of the reference vehicle; then
photographing a rear side of a target vehicle in front of the reference vehicle, using a camera; then
calculating, by a controller, an entire average brightness of an image of the rear side of the target vehicle photographed by the camera; then
determining, by the controller, whether the entire average brightness is greater than a predetermined reference brightness;
when the entire average brightness is greater than the predetermined reference brightness, turning on, by the controller, a brightness adjusting function of the high lamp and determining, by the controller, whether a backlight area of the target vehicle exists in the image; then
detecting, by the controller, the brightness difference between the backlight area and a non-backlight area of the target vehicle; and
when the brightness difference between the backlight area and a non-backlight area of the target vehicle is greater than a reference value, controlling, by the controller, the high lamp of the reference vehicle in order to remove glare to the eyes of a driver of the target vehicle, caused by light of the high lamp of the reference vehicle, and to remove glare to the eyes of a driver of the reference vehicle, caused by light of the high lamp of the reference vehicle reflected from a rear view mirror of the target vehicle, wherein the controlling of the high lamp is one of adjusting a brightness of the high lamp, turning-off of the high lamp and adjusting an angle of the high lamp.

15. The method of claim 14, wherein the adjusting the angle of the high lamp includes adjusting an angle of a horizontal direction.

16. The method of claim 14, wherein the adjusting the angle of the high lamp includes adjusting an angle of a vertical direction.

17. The method of claim 14, wherein the camera is mounted near to the high lamp of the reference vehicle.

* * * * *